United States Patent
Bak et al.

(10) Patent No.: US 12,390,966 B2
(45) Date of Patent: Aug. 19, 2025

(54) SPACER FOR HARNESS BUNDLE

(71) Applicant: Aptiv Technologies AG, Schaffhausen (CH)

(72) Inventors: Szymon Bak, Cracow (PL); Pawel Forys, Cracow (PL)

(73) Assignee: APTIV TECHNOLOGIES AG, Schaffhausen (CH)

( * ) Notice: Subject to any disclaimer, the term of this patent is extended or adjusted under 35 U.S.C. 154(b) by 120 days.

(21) Appl. No.: 18/126,628

(22) Filed: Mar. 27, 2023

(65) Prior Publication Data

US 2023/0390982 A1  Dec. 7, 2023

(30) Foreign Application Priority Data

Jun. 7, 2022  (EP) .................................... 22177687

(51) Int. Cl.
| | |
|---|---|
| *B29C 45/14* | (2006.01) |
| *H01B 13/012* | (2006.01) |
| *B29K 75/00* | (2006.01) |
| *B29L 31/34* | (2006.01) |

(52) U.S. Cl.
CPC . *B29C 45/14065* (2013.01); *H01B 13/01209* (2013.01); *B29C 2045/14131* (2013.01); *B29C 2045/14147* (2013.01); *B29C 2045/14163* (2013.01); *B29K 2075/02* (2013.01); *B29L 2031/3462* (2013.01)

(58) Field of Classification Search
CPC .... B29C 45/14065; B29C 2045/14131; B29C 2045/14147; B29C 2045/14163; H01B 13/01209; B29K 2075/02; B29L 2031/3462

USPC ......................................................... 264/275
See application file for complete search history.

(56) References Cited

U.S. PATENT DOCUMENTS

| | | | | |
|---|---|---|---|---|
| 2,600,111 | A | | 6/1952 | Isenberg |
| 3,296,688 | A | * | 1/1967 | Hervig ................... H02G 5/066 |
| | | | | 174/99 R |
| 3,361,866 | A | * | 1/1968 | Babigan ................... H01B 9/06 |
| | | | | 174/28 |
| 4,018,978 | A | * | 4/1977 | Bacvarov ............... H02G 5/066 |
| | | | | 174/167 |
| 9,758,114 | B1 | | 9/2017 | Volpone et al. |

(Continued)

FOREIGN PATENT DOCUMENTS

| | | |
|---|---|---|
| DE | 102018220197 B3 | 3/2020 |
| GB | 2243254 A | 10/1991 |
| WO | 0142055 A1 | 6/2001 |

OTHER PUBLICATIONS

Kafer, B., et al., "English machine-translation by Clarivate Analytics of DE-102018220197-B31, with full DE patent included", Nov. 23, 2018.(Year: 2018).*

(Continued)

*Primary Examiner* — Abbas Rashid
*Assistant Examiner* — Gregory C. Grosso
(74) *Attorney, Agent, or Firm* — Billion & Armitage

(57) ABSTRACT

A spacer for maintaining one or more wires during a molding process, the spacer having an external frame, and a plurality of spring curved leaves. Each spring curved leaf has a fixed end attached to an inner face of the external frame and a free end. The free ends of the plurality of spring curved leaves are arranged to flexibly wrap the one or more wires.

14 Claims, 5 Drawing Sheets

(56) References Cited

U.S. PATENT DOCUMENTS

| | | |
|---|---|---|
| 10,937,597 B2 | 3/2021 | Forssen et al. |
| 2019/0134873 A1 | 5/2019 | Untiedt |
| 2019/0161032 A1 | 5/2019 | Einert et al. |

OTHER PUBLICATIONS

Torrents, G., "English machine-translation by Clarivate Analytics of WO-0142055-A1, with full WO patent included", Nov. 16, 2000. (Year: 2000).*
Torrents, G., "English machine—translation by Clarivate Analytics of WO-0142055-A1, with full WO patent included", Nov. 16, 2000. (See NPL filed on Dec. 27, 2024). (Year: 2000).*
Extended European Search Report for Application No. 22177687.5; dated Nov. 17, 2022; 7 pages.
Technical Data Sheet for "SANICUBIC 2VX"; Sanibroy—SFA Group; downloaded from https://www.sanibroy.de/module/attachment123/attachment?id=177 on Mar. 24, 2023; 2 pages.

* cited by examiner

SPACER FOR HARNESS BUNDLE

CROSS-REFERENCE TO RELATED APPLICATION

This application claims benefit of priority to European Patent Application No. 22177687.5 filed on Jun. 7, 2022, the entire disclosure of which is hereby incorporated by reference.

TECHNICAL FIELD OF THE INVENTION

The present disclosure relates to a spacer for maintaining a position of one or more wires, or one or more harnesses, or bundles or generally speaking pieces to be maintained, in particular during molding process, and a method of manufacturing overmolded wires. This is of interest in the automotive industry in particular.

BACKGROUND

Highly resistant polyurethane foam sealing of single wires or wire bundles is a standard sealing for firewall grommets. Polyurethane foam can be used also for other applications, for example splice overmolding, rigid wiring, and ring terminal sealing cups.

The common way of creating a polyurethane product on a wire harness is injection of polyurethane material into a mold through which wire harness passes.

Currently, operators need to take extra care in the wire/harness molding process to manually shape the wire/harness in the mold to ensure that no wires are touching the mold. However, after the closing of the mold, there is no feedback or assurance that wires remain in the desired position. This has at least the following disadvantages: there is a risk of damaging the wires during the closing of the mold, there is difficulty in placing the wire/harness and positioning it in the mold, there is a risk of wires on the product surface after the molding process, and there is a risk of short circuit between the wires.

Customer-specific wiring harness production is bringing a challenge because wire harness diameter depends on the specification of the end customer. With high content wire harness, there is a risk that wires can touch the mold surface, i.e., cavity surface of the mold, which can lead to jeopardizing sealing capabilities of the overmolding part and to create the risk of a short circuit. That is to say, the wire touching the mold surface is not fully covered by the polyurethane and thereby the wire is not fully overmolded and is not fully protected.

Additionally, there is a need to overmold very long components on the harness. This leads to the situation where a wire harness or generally speaking a piece to be maintained, under its own weight or due to geometry, can sag within the mold, thereby causing the same risk as described before. That is to say, the wire, wire harness, or a part of the bundle may fall down due to its own weight and touch the mold, so that said wire will not be correctly overmolded by the sealing material, such as polyurethane, and thereby will be badly protected. The same situation may be caused by 3D shape of the product, like twisted S shape which even in vertical mold can cause issues, i.e., issues are not only due to gravity but also shapes of the parts.

GB 2,243,254 A discloses a spacer for two or more cables or cable cores comprising a star-shaped body of stiff material having radial arms locating the cores or cables at a predetermined distance from each other, and an annulus of stiff material encompassing said cables or cores. However, this provides no adjustment to a variety of cable diameters nor the possibility to correctly allow the molding of the sealing material therein, due to the plain shape and the sealing flow resistance.

Therefore, there is a need for another kind of solution that is a good trade-off for overcoming the different drawbacks of the prior art. In particular, there is a need to solve the problems of decentralization of pieces to be maintained such as a wire harness within the mold during sealant e.g., polyurethane process, of wire harness sagging within the mold, especially with long and/or 3D products, and of minimum distance of harness to the mold and its effect on polyurethane overmolding surface.

SUMMARY

The present disclosure concerns a spacer for maintaining one or more pieces during a molding process, the spacer having an external frame and a plurality of spring curved leaves. Each spring curved leaf has a fixed end attached to an inner face of the external frame and a free end. The free ends of the plurality of spring curved leaves are arranged to flexibly wrap the one or more pieces to be maintained.

A leaf may be defined as a thin sheet or plate of any substance. That is, the curved spring leaf is a leaf which is curved, is flexible and allows for a spring effect, i.e., elastic return force. As used herein, flexible means capable of movement, in contrast with the external frame which is rigid. Further, as used herein wrap means to envelop and secure for transportation or storage, which is to say to embrace, to enfold, or to surround. A spacer is a device or piece used to create or maintain a desired amount of space, i.e., to maintain a distance between the one or more pieces to be maintained, e.g., wires, held by the spacer and the mold, in particular inner surface of the mold, i.e., in the mold cavity surface.

This allows to provide an easier manufacturing of the spacer and the one or more pieces to be maintained, e.g., wires, to be overmolded, in particular for easy installation on a wire harness, harnesses, or wire(s). An overmolded wire or overmolded piece to be maintained, is understood as a wire or a piece to be maintained which is covered or surrounded by a sealing material, such as polyurethane. The one or more pieces to be maintained may be one or more wires. Instead of electrical wires, pneumatic tubes, fiber optics, and the like may also be present in the bundle or being even directly wrapped by the spacer and are examples of pieces to be maintained or clamped. That is, a wire is something (such as a thin plant stem) that is wirelike in a general meaning; or to be more specific, an electrical wire and the like.

Further, this allows to provide a spacer, also called fishbone insert, which could be preinstalled on the piece(s) to be maintained, wire(s), or harness(es), to firstly ensure that all around the harness there is a minimum distance to the mold surface, to secondly eliminate harness sagging by supporting its weight, and thirdly ensure that harness routing passing the mold is substantially following nominal center line, in particular theoretical nominal center line designed by computer-aided design (CAD), e.g., 3D CAD. The spacer can be called a fishbone insert because it can be defined as a set or network of elongated components like bones of a fish, corresponding to the spring curved leaves having free ends and connected by fixed portions to a spine corresponding to the external frame being a skeleton or a structural framework.

Still further, this allows to provide a spacer or fishbone insert designed to cover all harness diameters, in particular within a car project. This allows to be designed as a single piece component which can be simply clipped on the pieces to be maintained, on wire harness or a few-part component which can be assembled on the harness with usage of its own locks or additional component such as cable ties.

That is, the spacer according to the present disclosure allows to provide a correct centralization of the pieces to be maintained, e.g., wire harness, inside the mold prior to injection process, to eliminate, limit, suppress, or compensate the wire harness sagging under its own weight, to eliminate, limit, suppress, or compensate wire harness sagging due to 3D shape of polyurethane component, and additional tension brought with this, to correct flow of polyurethane material to the wires, and to provide compatibility with polyurethane foam not to lower or decrease sealing function.

The present disclosure significantly improves spacer and molding process, especially the part which is operator dependent and then completely random.

The spacer according to the present disclosure thereby allows for an easier wire/harness placement in the mold, an easier spacer installation on the wire/harness, the elimination of loose wires which can be smashed during closing of the mold, the elimination of visible wire after the molding process, the elimination of short circuit risk due to wires visible on sealing material, e.g., polyurethane, product surface, and more flexibility in matter of processing different harness diameters.

The spacer according to the present disclosure enables development of a completely new line of polyurethane composite products, which could be more compact as spacers eliminate the need to design with extra wall thickness in order to compensate harness or single wire displacement from the center line.

Advantageously, the free ends are movable between a first position so as to define a first wrapping portion, and at least a second position, different from the first position, so as to define a second wrapping portion.

Advantageously, the first wrapping portion and the second wrapping portion are defined by a surface of the free end arranged to be in contact with the one or more pieces to be maintained, e.g., wires. That is, the first wrapping portion and the second wrapping portion can be a plurality of lines of contact or surfaces or thin surfaces of the free ends on the one or more wires. The difference between the first wrapping portion and the second wrapping portion is that they are placed in different diameters to allow different diameter of wires to be held in place.

Advantageously, the first wrapping portion and the second wrapping portion are cavities receiving the one or more pieces to be maintained, e.g., wires.

Advantageously, each free end is arranged to be in contact with the one or more pieces to be maintained.

This allows to provide an improved support to the one or more wires, in particular to allow for a flexible support and an adjustment in case of introduction of wires of different diameters. That is, the spacer allows to receive wires of different diameters, or to better maintain a plurality of wires at the same time.

Advantageously, the free ends extend inwardly.

Advantageously, the spring curved leaves extend in a direction having a radial component and a tangential component.

Advantageously, the external frame has an external surface (or external face) and a groove for a cable tie arranged on the external surface, preferably circumferentially. This allows to facilitate the fixation of the spacer holding the one or more wires with a cable tie.

Advantageously, the spacer further has a hinged portion and a lock portion, preferably opposed to the hinged portion. the spacer is arranged to define an opened position wherein the one or more pieces to be maintained can be introduced in the spacer, and a closed position. The one or more pieces to be maintained can be wrapped by the spacer at the level of the free ends. This allows to facilitate the manufacturing of the one or more overmolded wires, in particular by facilitating the introduction of the one or more wires in the spacer so as to be held in place.

Advantageously, the spacer further has at least one lock portion. This allows to provide a fixation system between two portions of the spacer, thereby facilitating the manufacturing.

Advantageously, each spring curved leaf has a curvature with an internal curved portion and an external curved portion, and the plurality of spring curved leaves is arranged so as to contact the one or more pieces to be maintained on the internal curved portion or on the external curved portion. In other words, each spring curved leaf extends at an oblique angle from the inner face of the external frame and has a curvature such that the free end of each curved leaf is configured to contact the one or more pieces to be maintained on a concave side of the curvature or on a convex side of the curvature. This allows to improve the support of the one or more pieces to be maintained (e.g., wires).

Advantageously, the external frame has at least one outside pin. This allows to improve the positioning of the spacer by locating the outside pin in a corresponding (milled) pocket of the mold. In another variant, the pin is only touching the cavity surface, assuring that no outer face of the insert is not visible, to allow to have more sealant on the outside for a better mechanical integrity.

Advantageously, the spacer is made out of plastic or resin, and could be integrally formed. This allows to provide an easy manufacturing.

A second aspect of the present disclosure concerns a method for overmolding one or more pieces to be maintained, the method comprising the steps of: providing at least one spacer according to the first aspect, providing one or more pieces to be maintained (or one or more harnesses, or a bundle of these), installing in a mold the at least one spacer, and the one or more pieces to be maintained in contact with free ends of the spacer, injecting a sealing material, such as polyurethane, in the mold so as to overmold the one or more pieces to be maintained.

This allows to facilitate the manufacturing and the overmolding of one or more pieces to be maintained, e.g., wires. This also allows to have the above mentioned effects and advantages, as explained with respect to the first aspect.

Advantageously, the method further has the step of opening the mold so as to extract the one or more overmolded pieces to be maintained. This allows to manufacture the one or more overmolded wires and to extract it from the mold.

Advantageously, the spacer has an external frame with at least one outside pin, and the method further has the step of placing the at least one outside pin of the spacer in at least one pocket of the mold. This allows to provide an improvement of the localization of the spacer in the mold, so as to ensure the correct overmolding of the one or more wires.

BRIEF DESCRIPTION OF THE DRAWINGS

The present invention is now described, by way of example with reference to the accompanying drawings, in which.

DETAILED DESCRIPTION

The present disclosure relates to a spacer for allowing space between pieces to be maintained and a mold, in a molding process, so as to provide high quality overmolding of the pieces.

Figure 1:
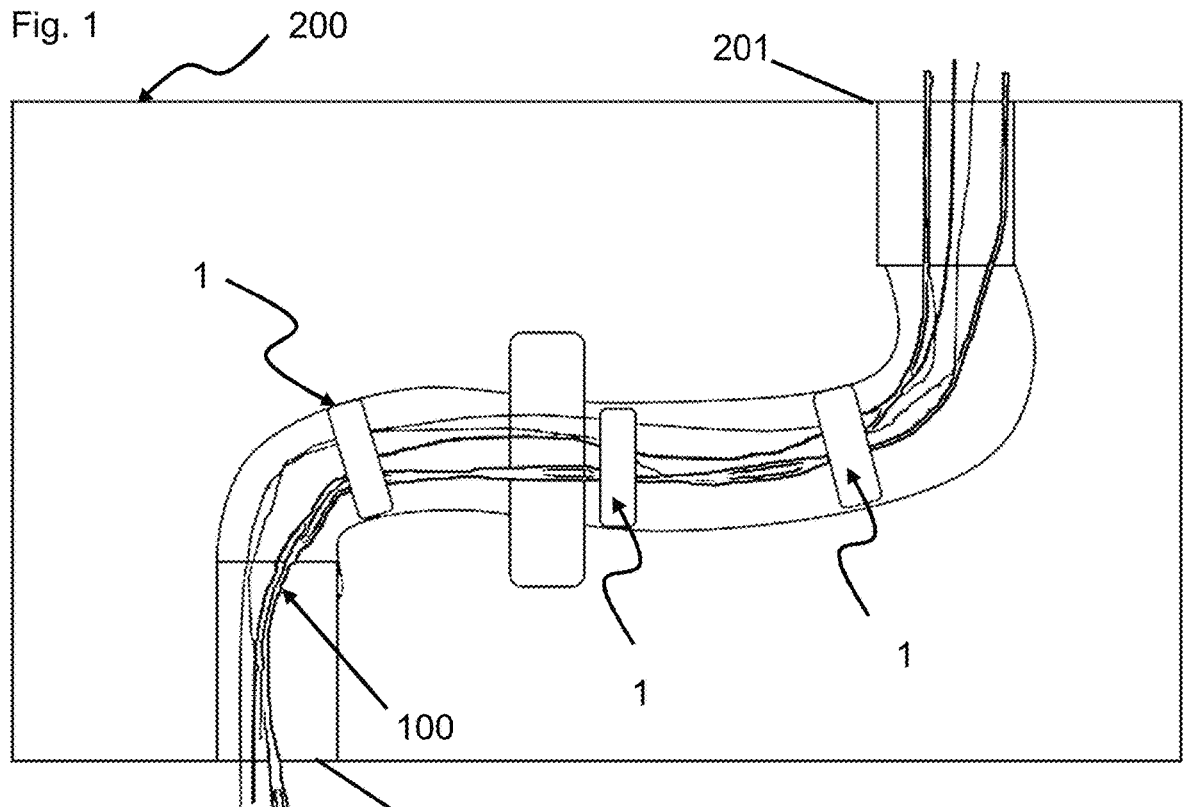
FIG. 1 illustrates a spacer according to a first embodiment with pieces to be maintained therein in a mold according to some embodiments.

FIG. 1 illustrates three spacers 1 according to a first embodiment with pieces to be maintained 100 therein, in a mold 200. In the present embodiment, the pieces to be maintained 100 may be wires. The mold 200 has an entry portion 201 and an exit portion 202. Each spacer 1 is positioned in the mold 200. The wires 100 are positioned inside each spacer 1, and follow the path defined by both the spacers 1 and the mold 200. A sealing material, such as polyurethane (PUR), can be introduced in the mold 200, in order to overmold the pieces to be maintained, e.g., wires 100. Injection channel and air vents are not represented in the drawings. The mold 200 may be adapted for PUR foaming process or PUR potting process, in particular with respect to entry portion 201, exit portion 202, injection channel and air vents, and the like, as necessary. That is, as the spacers 1 allows to avoid that the pieces to be maintained, e.g., wires, 100 directly touch the mold 200, the pieces to be maintained, e.g., wires, 100 can be entirely overmolded and correctly protected, without any piece to be maintained, e.g., wires, 100 uncovered by the sealing material.

Figure 2:
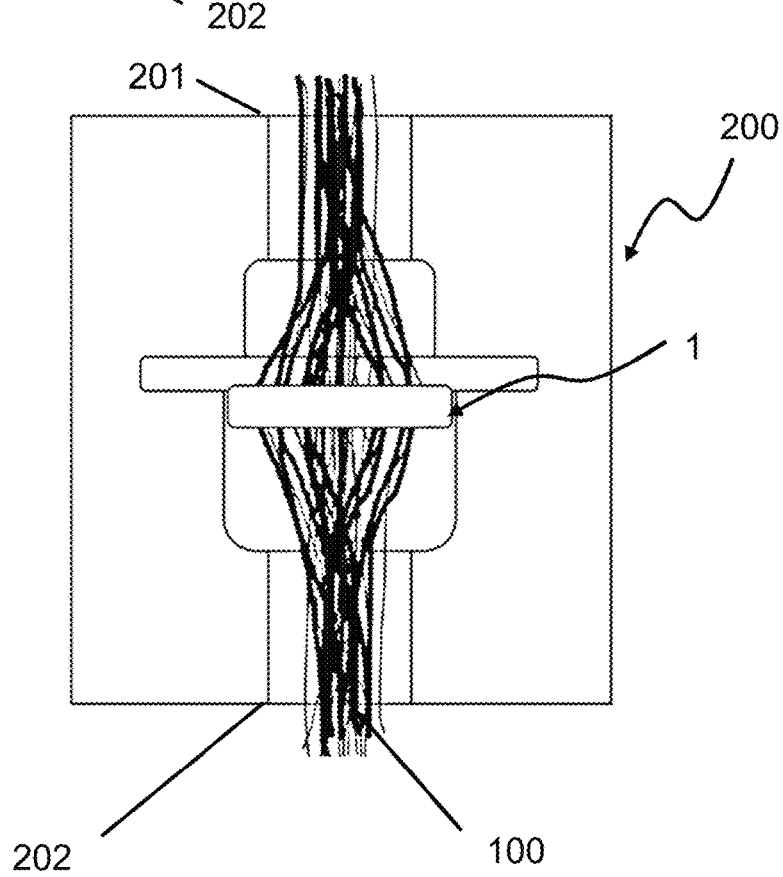
FIG. 2 illustrates the spacer according to the first embodiment, in another mold according to some embodiments.

FIG. 2 illustrates the spacer 1 according to the first embodiment, in another mold 200. The other mold 200 also has the entry portion 201 and the exit portion 202. The wires are examples of pieces to be maintained, and the description is generally applicable to any piece to be maintained. For sake of brevity, the term wire is used hereafter. The spacer 1 maintains the wires 100 in a desired path, so that none of the wires 100 directly touch the mold 200. Thereby, a correct overmolding of the wires 100 is achieved.

Figure 3:
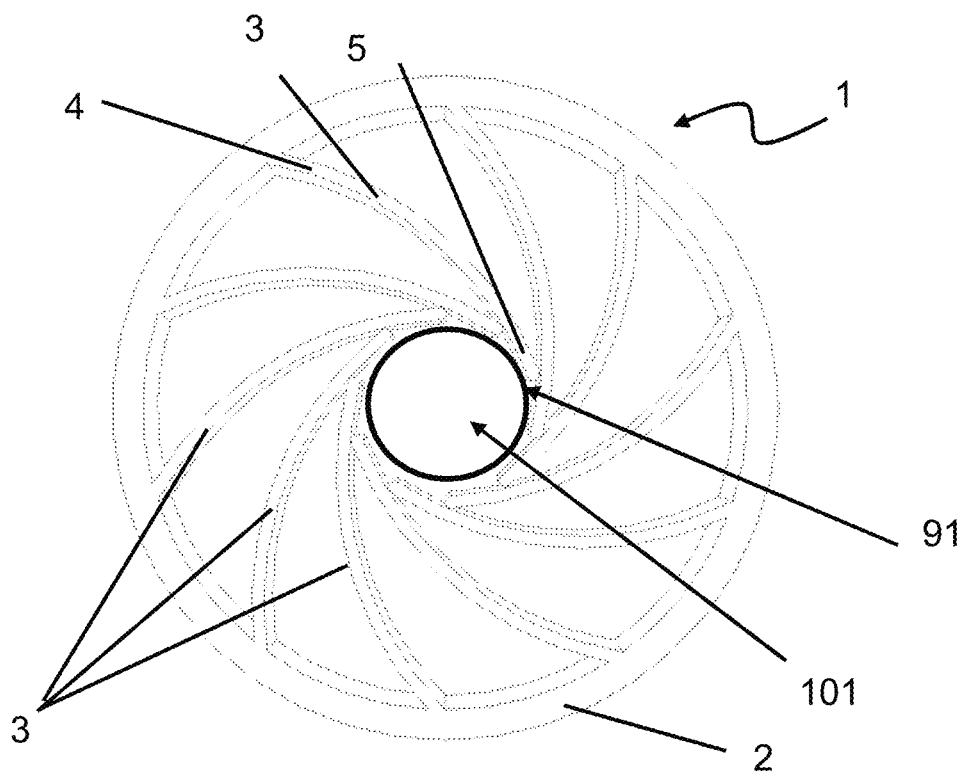
FIG. 3 illustrates the spacer according to the first embodiment with a first wire therein according to some embodiments.
Figure 8:
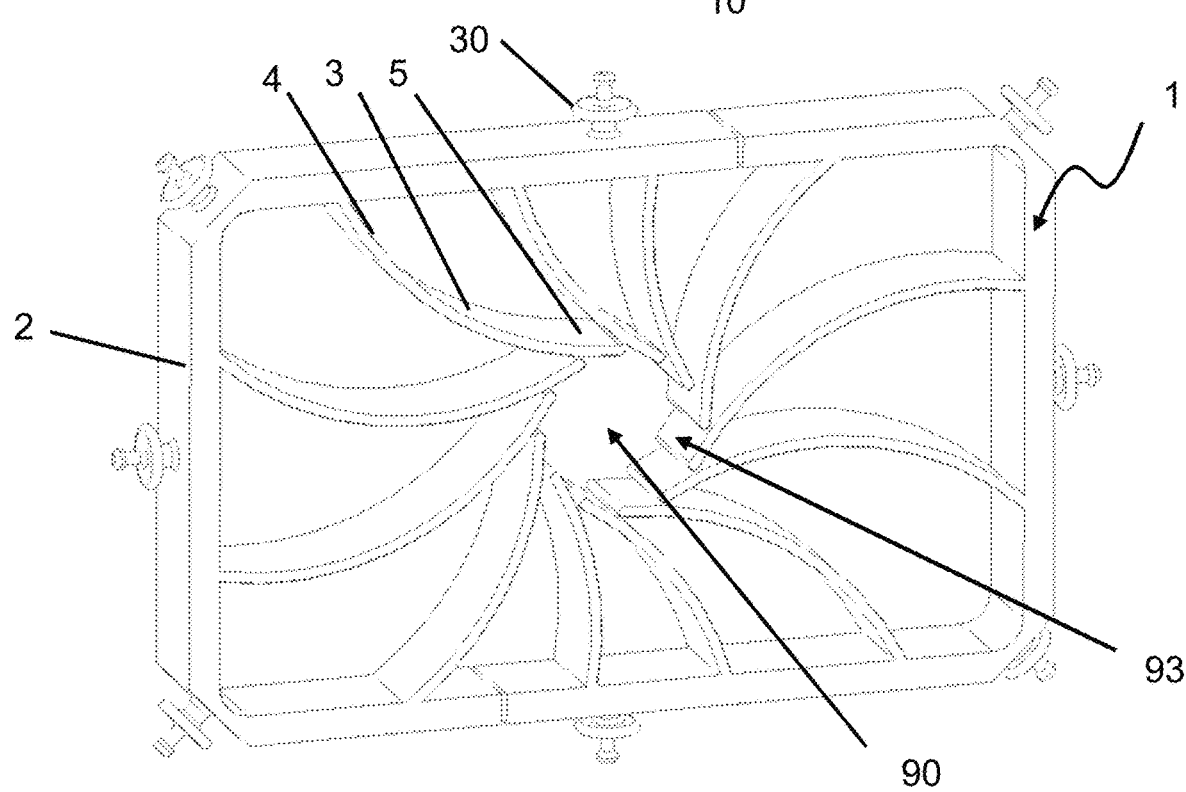
FIG. 8 illustrates the spacer according to a fifth embodiment with a rectangular external frame and outside pins according to some embodiments.

FIG. 3 illustrates the spacer 1 according to the first embodiment with a first wire 101 therein, which is an example of a first piece to be maintained. The first wire 101 is an example of wires 100 and may also be a bundle or a harness having the same shape of first wire 101. The spacer 1 has an external frame 2 supporting a plurality of spring curved leaves 3. Each of the spring curved leaves 3 has a fixed end 4 attached to an inner face or inner surface of the external frame 2. Each spring curved leaf 3 further has a free end 5. The free ends 5 are arranged to flexibly wrap the first wire 101 as shown in FIG. 3. That is, the free ends 5 of the spring curved leaves 3 defines a first wrapping portion 91, having a first diameter matching with the diameter of the first wire 101. The free ends 5 are represented in FIG. 3 in a first position. Each free end 5 is arranged to be in contact with the first wire 101. Thereby, a flexible support and wrapping is provided to the first wire 101. That is, each spring curved leaf 3 extends at an oblique angle from the inner face of the external frame 2 and has a curvature such that the free end 5 of each curved leaf 3 is configured to contact the first wire 101 on a concave side of the curvature or on a convex side of the curvature as illustrated in FIG. 8. In other words, the spring curved leaf 3 has an elongate shape with the fixed end 4, also called proximal portion, supported by the external frame and projecting inwardly, i.e., to an inside of the spacer 1, and with the free end 5, also called distal portion. The distal portion is provided with a contact surface, or a contact line arranged to contact the first wire 101 and maintain it, in cooperation with the other contact surfaces of the other spring curved leaves 3.

Figure 4:
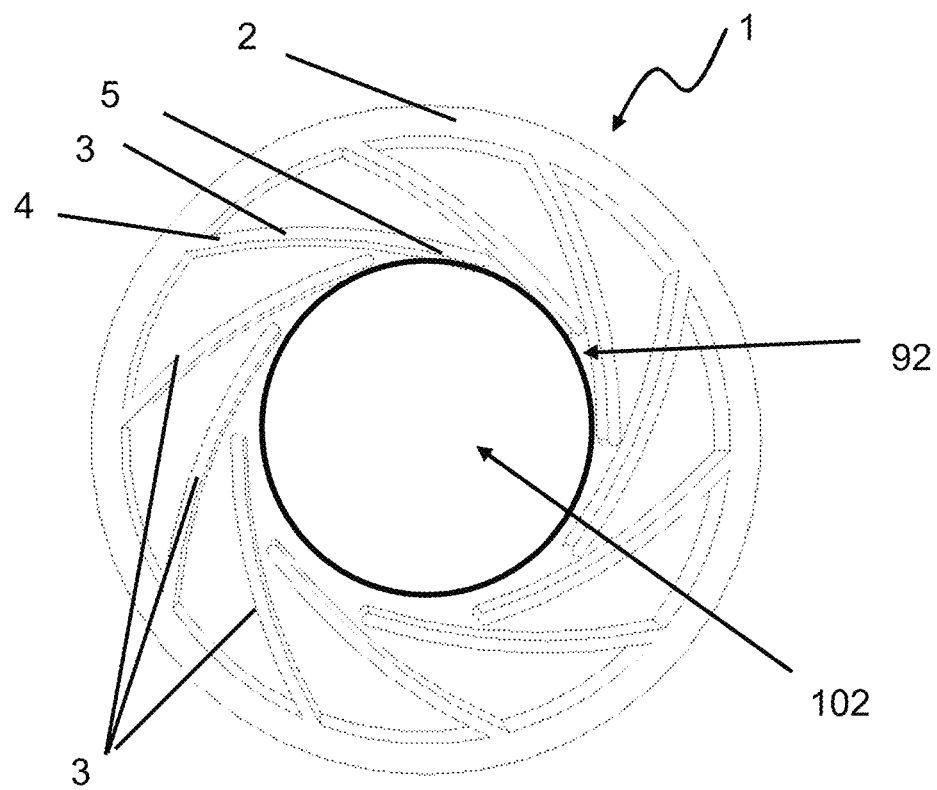
FIG. 4 illustrates the spacer according to the first embodiment with a second wire according to some embodiments.

FIG. 4 illustrates the spacer 1 according to the first embodiment with a second wire 102, which is an example of a second piece to be maintained. The reference number are kept as far as possible with respect to the different figures. The second wire 102 is an example of wires 100, and may also be a bundle or a harness having the same shape of second wire 102. The free ends 5 of the spring curved leaves 3 defines a second wrapping portion 92, having a second diameter matching with the diameter of the second wire 102. The free ends 5 are represented in FIG. 4 in a second position. Each free end 5 is arranged to be in contact with the second wire 102. The diameter of the second wire 102 is greater than the diameter of the first wire 101 in the example shown in FIGS. 3 and 4. Thereby, a flexible support and wrapping is provided to the second wire 102, with the same spacer 1 as for the first wire 101 having a smaller diameter.

In other words, the free ends 5 are movable between a first position so as to define the first wrapping portion 91, and the second position, different from the first position, so as to define the second wrapping portion 92.

The first position corresponding to the first wrapping portion 91 may be considered as a rest position when no load is applied on the free ends 5 and on the spring curved leaves 3, due to a nominal diameter corresponding to the first wire 101. The second position corresponding to the second wrapping portion 92 may be considered as a work position when a load is applied on the free ends 5 and on the spring curved leaves 3, due to the diameter of the second wire 102 which is bigger than the nominal diameter.

Further, the spring curved leaves 5 allows for an improved flow resistance of the sealing material, e.g., polyurethane, when introduced in the mold 200, so as to facilitate the correct repartition of the sealing material in the mold 200 and improving the correct overmolding of the wires 100.

In an embodiment, it is to be noted that the fixed end 4 may be attached to the inner face of the external frame by a flexible anchoring portion, to further adjust and improve the flexibility of the spring curved leaves 3.

Figure 5:
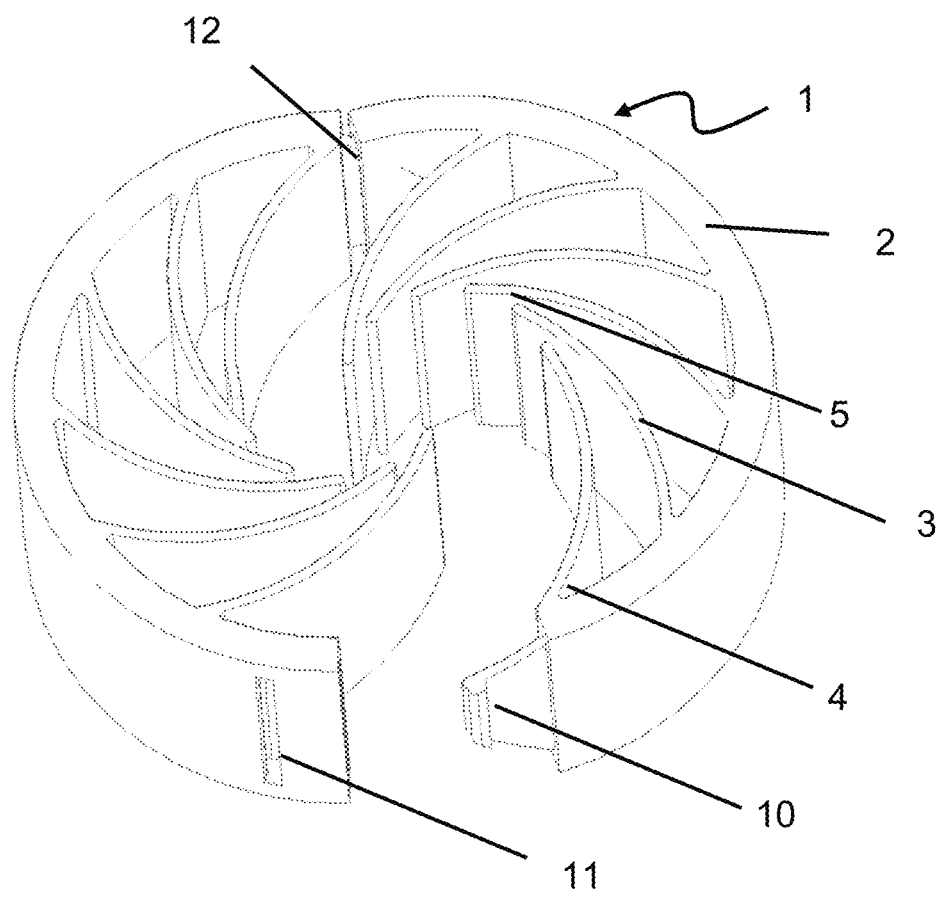
FIG. 5 illustrates the spacer according to a second embodiment with a hinged portion, in an opened position according to some embodiments.
Figure 6:
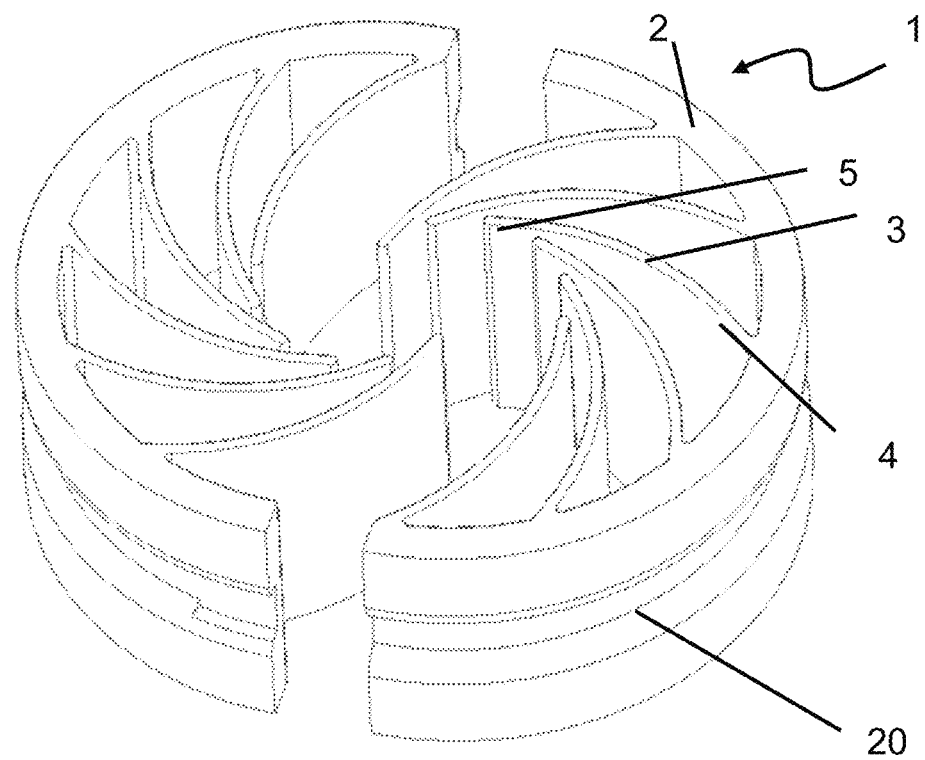
FIG. 6 illustrates the spacer according to a third embodiment with a groove for a cable tie according to some embodiments.

FIG. 5 illustrates the spacer 1 according to a second embodiment with a hinged portion 12, in an opened position. The reference number are kept as far as possible between the different figures and different embodiments. In the opened position, the wires 100 can be easily placed in the spacer 1, and the spacer 1 can be closed thereafter. The spacer 1 may have a lock portion having a hook 10 and a groove 11 arranged to retain the hook 10. Thereby, the spacer 1 can be maintained in a closed position and retain the wires 100. FIG. 6 illustrates the spacer 1 according to a third embodiment with a groove 20 for a cable tie. That is, after the wires 100 are being overmolded with the sealing material, the groove 20 may receive a cable tie (not shown) in order to fix the overmolded wires 100 onto a support or the like, for final use of the wires 100. The groove 20 is preferably circumferential in order to receive the cable tie. The groove 20 is preferably placed on an outer surface of the external frame 2, the outer face being opposite to the inner face. In another aspect, it is possible to use the cable ties as a fixation method for the insert itself, to keep both half portion locked together on the harness, especially with a big harness inside.

Figure 7:
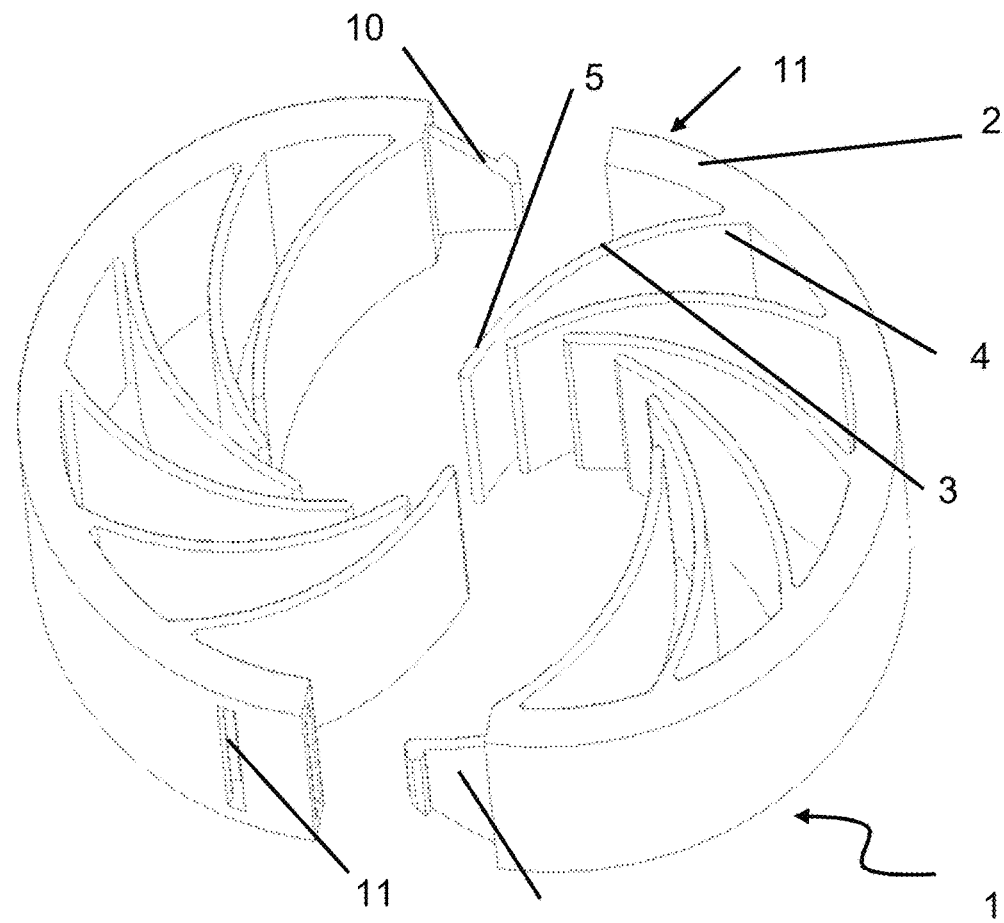
FIG. 7 illustrates the spacer according to a fourth embodiment with lock portions according to some embodiments.

FIG. 7 illustrates the spacer 1 according to a fourth embodiment with lock portions. The spacer 1 may have for example two lock portions having the grooves 11 and the hooks 10, so as to maintain the spacer 1 in the closed position. The grooves 11 are arranged to cooperate with the hooks 10 so as to maintain the spacer 1 in a closed position.

FIG. 8 illustrates the spacer 1 according to a fifth embodiment with a rectangular external frame 2 and outside pins 30. The rectangular external frame 2 is an example of external frame 2. The external frame 2 has outside pins 30. The outside pins 30 may be located in milled pockets of the mold 200 so as to better placed and locate the spacer 1 in the mold 200. Also, they can be used to create space for sealant to fully cover the outside face of the external frame.

As illustrated in FIG. 8, each spring curved leaf 3 extends at the oblique angle from the inner face of the external frame 2 and has the curvature such that the free end 5 of each curved leaf 3 is configured to contact the one or more pieces to be maintained 100, 101, 102 on a convex side of the curvature. This is to be compared with FIG. 3 wherein the contact between the one or more pieces to be maintained 100, 101, 102 is on the concave side of the curvature. It is to be noted the oblique angle may be adapted according to the configuration. That is, each of the spring curved leaves 3 has the curvature. The wrapping portion 93 is represented in FIG. 8 and is defined by external portions of the spring curved leaves 3, on an external side of their curvature, which is to say on the convex side of the curvature.

In contrast, in FIGS. 3 to 7, the wrapping portions 91-92 are formed by internal portions of the spring curved leaves 3, on an internal side of their curvature, which is to say on their concave side.

Figure 9:
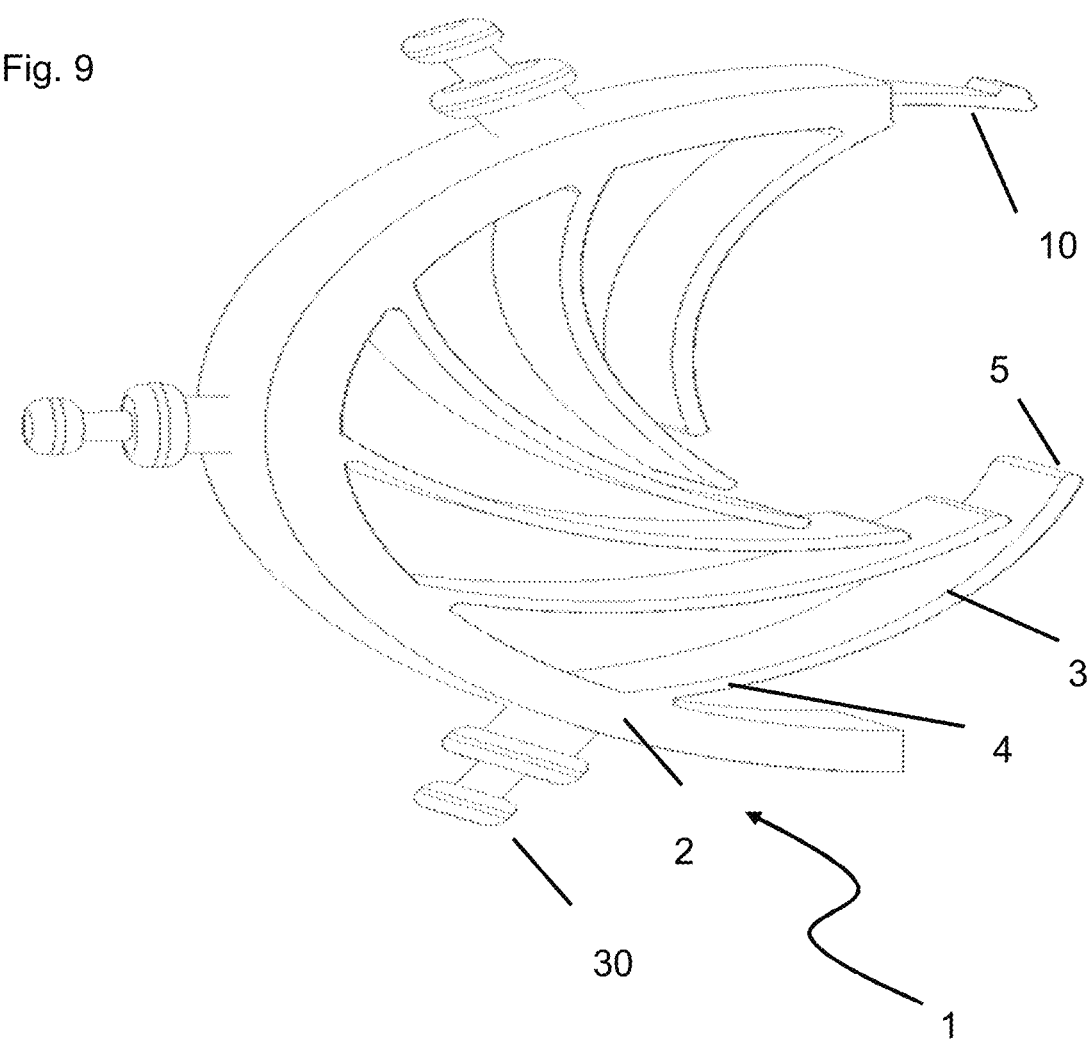
FIG. 9 illustrates the spacer according to a sixth embodiment with oval shape according to some embodiments.

FIG. 9 illustrates the spacer 1 according to a sixth embodiment with an oval shape. The spacer 1 has an oval shape so as to be adaptable to a desired shape of the overmolded wires 100. The spacer 1 is also represented with the hook 10, the outside pins 30, the external frame 2 and the spring curved leaves 3. That is, the spacer 1 according to the above embodiments, also called fishbone inserts, are designed to ensure that the spacer 1 is suitable to accommodate differences in harness/wire diameters with constant outer diameter of the space, so as to match the mold cavity of the mold 200 and match the shape of the final product. The spacer 1 has a plurality of spring curved leaves (also called internal leaves) which are flexible and can bend accordingly to match the shape and size of harness/wire inside. It can also be applied on single wires or any other object to be overmolded. The internal structure could also be shaped to fit a rectangular shape (as shown in FIG. 8) with spring like structures having the same final effect. Outside walls of the spacer 1, i.e., external frame 2 are thick enough so as to keep their geometry and diameter constant. The spacer geometry can be adjusted according to the sealing final desired shape. The same applies for further consideration of the quantity and shapes of spring curved leaves 3 inside the spacer 1.

Outside pins 30 are useful to:
  minimize spacer area which can be exposed on final sealing material product;
  protect the spacer 1 from being covered by release agent present on the mold walls; and
  fix position between the spacer 1 and the mold 200. The mold can be prepared with milled pockets in which those outside pins 30 can be registered to move forward with injection.

After closing the mold, injection of sealing material, e.g., polyurethane, is performed. Due to the spring curved leaves 3, the sealing material can easily flow between them assuring correct filling of the mold 200 and stable molding process. The spacer 1 can be made from material compatible with the sealing material to ensure a good adherence. The sealing material is preferably polyurethane but can also be PVC, PA, TPU or any suitable material, After the process, the final product, i.e., the one or more overmolded wires/ harnesses/bundle can be de-molded, i.e., removed from the mold 200.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes", "including", "includes", and/or "including," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any order of arrangement, order of operations, direction or orientation unless stated otherwise.

The invention claimed is:

1. A spacer for maintaining one or more pieces during a molding process, the spacer comprising:
    an external frame; and
    a plurality of spring leaves, wherein each spring leaf has a fixed end attached to an inner face of the external frame and a free end, wherein the free ends of the plurality of spring leaves are arranged to flexibly wrap the one or more pieces to be maintained, wherein each spring leaf is a spring curved leaf that has, in a rest position, a curvature such that the free end of each curved leaf is configured to contact the one or more pieces to be maintained on a concave side of the curvature or on a convex side of the curvature, wherein each spring curved leaf extends, in the rest position, at an oblique angle from the inner face of the external frame, wherein the number of spring curved leaves is greater or equal to six, and wherein the spring curved leaves are evenly distributed around the inner face of the external frame.

2. The spacer according to claim 1, wherein the free ends are movable between a first position so as to define a first wrapping portion, and at least a second position, different from the first position, so as to define a second wrapping portion and wherein the first wrapping portion and the second wrapping portion are a plurality of lines of contact or surfaces or thin surfaces of the free ends on the one or more pieces and the difference between the first wrapping portion and the second wrapping portion is that they are placed in different diameters to allow different diameter of the one or more pieces to be held in place.

3. The spacer according to claim 1, wherein each free end is arranged to be in contact with the one or more pieces to be maintained.

4. The spacer according to claim 1, wherein the external frame has an external surface and a groove arranged circumferentially on the external surface.

5. The spacer according to claim 1, wherein the spacer further has a hinged portion and a lock portion preferably opposed to the hinged portion, and wherein the spacer is arranged to define an opened position wherein the one or more pieces to be maintained can be introduced in the spacer, and a closed position wherein the one or more pieces to be maintained can be wrapped by the spacer at a level of the free ends.

6. The spacer according to claim 1, wherein the spacer further has at least one lock portion.

7. The spacer according to claim 1, wherein the external frame has at least one outside pin.

8. The spacer according to claim 1, wherein the spacer comprises six leaves evenly distributed about the inner face of the external frame.

9. The spacer according to claim 1, wherein the spacer comprises ten leaves evenly distributed about the inner face of the external frame.

10. The spacer according to claim 1, wherein the spacer comprises twelve leaves evenly distributed about the inner face of the external frame.

11. A method for overmolding one or more pieces to be maintained, the method comprising:
    providing at least one spacer having an external frame and a plurality of spring leaves, wherein each spring leaf has a fixed end attached to an inner face of the external frame and a free end, wherein the free ends of the plurality of spring leaves are arranged to flexibly wrap the one or more pieces to be maintained, wherein each spring leaf is a spring curved leaf that has, in a rest position, a curvature such that the free end of each curved leaf is configured to contact the one or more pieces to be maintained on a concave side of the curvature or on a convex side of the curvature, wherein each spring curved leaf extends, in the rest position, at an oblique angle from the inner face of the external frame, wherein the number of spring curved leaves is greater or equal to six, wherein the spring curved leaves are evenly distributed around the inner face of the external frame, and wherein the free ends of the plurality of spring curved leaves are arranged to flexibly wrap the one or more pieces to be maintained;
    providing one or more pieces to be maintained;
    installing in a mold the at least one spacer, and the one or more pieces to be maintained in contact with free ends of the least one spacer; and
    injecting a sealing material in the mold so as to overmold the one or more pieces to be maintained.

12. The method according to claim 11, further comprising opening the mold so as to extract the one or more overmolded pieces to be maintained.

13. The method according to claim 11, wherein the external frame of the least one spacer has at least one outside pin and wherein the method further comprises placing the at least one outside pin of the least one spacer in at least one pocket of the mold.

14. The method according to claim 11, wherein the sealing material is polyurethane.

* * * * *